Jan. 15, 1963 R. C. RUSSELL 3,073,424
FRICTION DEVICE
Filed June 15, 1959 3 Sheets-Sheet 1

INVENTOR.
ROBERT C. RUSSELL
BY *Teagno & Stover*
ATTORNEY

Jan. 15, 1963 R. C. RUSSELL 3,073,424
FRICTION DEVICE
Filed June 15, 1959 3 Sheets-Sheet 2

INVENTOR.
ROBERT C. RUSSELL
BY *Teagno & Stover*
ATTORNEY

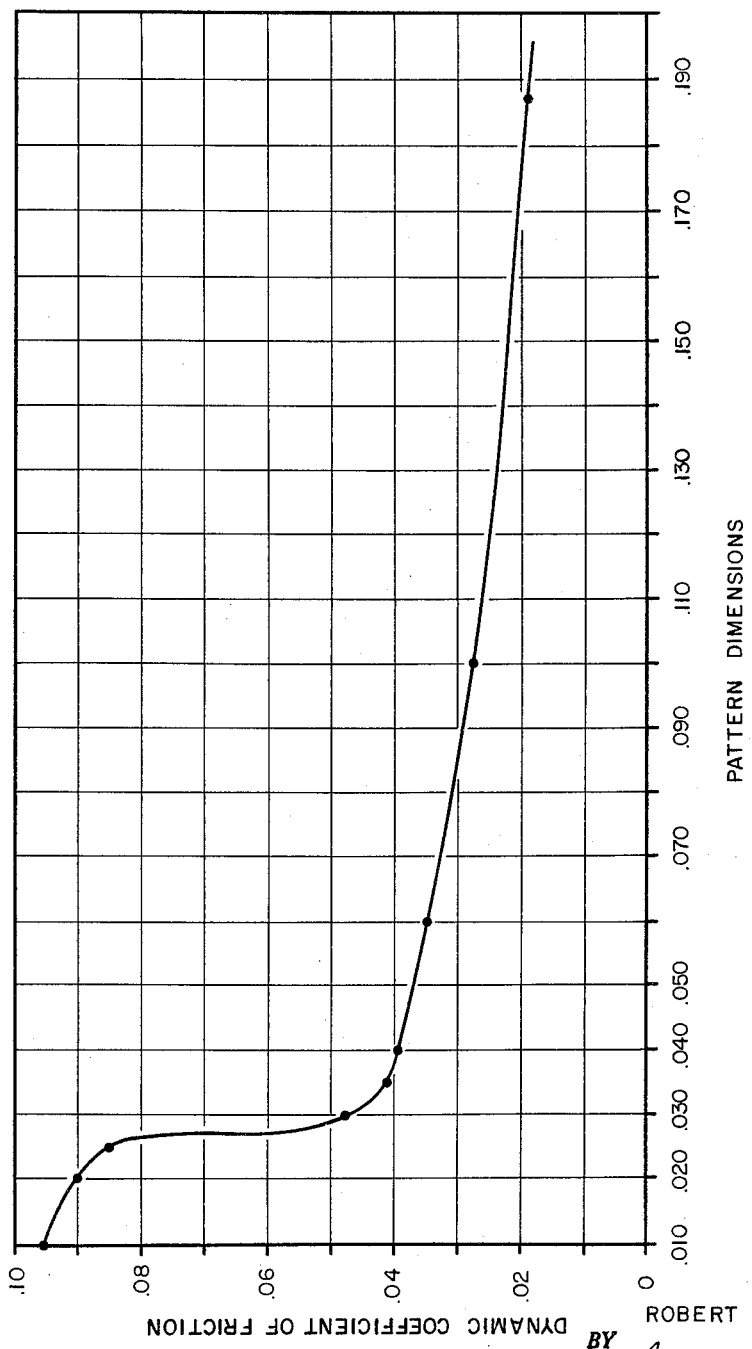

3,073,424
FRICTION DEVICE
Robert C. Russell, Shaker Heights, Ohio, assignor to Eaton Manufacturing Company, Cleveland, Ohio, a corporation of Ohio
Filed June 15, 1959, Ser. No. 820,535
7 Claims. (Cl. 192—113)

Friction materials for use in oil bath applications have come into wide spread use in recent years with the advent of planetary gear type automotive transmissions as well as many industrial uses where a great amount of energy must be dissipated within a very short time in a clutching or braking application. Oil bath lubricated friction materials have also become more feasible with the development of new friction materials, including organic and inorganic materials, as well as the discovery and use of binders which will withstand high temperature applications, high compressive forces and also resist distortion under these conditions.

There are several broad classifications of oil bath lubricated friction materials and generally, are enumerated as sintered metallic, semi-metallic, rigid molded, and resilient friction material.

Sintered metallic friction members are made up of metal particles and this material has a varying degree of porosity. The sintered metal is always mounted on a relatively strong basic disc, such as a steel disc, since sintered metal plates or discs are extremely weak structurally and are capable of carrying only low shear loads. For this reason, the toothed portions of the discs which are splined either to the inner or outer portion, must be made of a stronger material. The static coefficient of friction of sintered metal discs varies considerably with the particular metal particles used and the composition of the disc.

Semi-metallic friction members are compounded from metallic powders, friction modifiers and synthetic resin binders. There is a wide range of composition in this broad classification but copper is generally the predominating metal. Generally, the coefficient of friction of semi-metallic friction members is higher than sintered metallic but the durability of this type disc is not as great as sintered metallic.

Rigid molded friction members are generally comprised of a thermo-setting binder mixed with asbestos fiber and various friction implementing elements. Generally, the coefficient of friction of this type disc is higher than semi-metallic and sintered metallic elements. The rigid molded discs also have the ability to withstand extremely high compressive forces.

Resilient friction material members include all those materials which have a low elastic modulus. These materials include mixtures of cork, cellulose, asbestos and temperature resistant binders. The coefficient of friction range is relatively high and from a price standpoint, these materials are sometimes advantageous. However, the resilient type friction material will not generally withstand high localized temperatures. For example, cork and cellulose materials are destroyed when a temperature of around 400° F. is reached. This general review of friction materials is outlined to give a general background idea of the variety of conditions which must be satisfied in a friction material application.

The present invention relates solely to lubricated or oil bath type friction material as opposed to dry friction material since the phenomema which the disclosed structural configuration takes advantage of is peculiar to a lubricated surface rather than a dry surface.

It has been generally recognized that oil bath lubricated friction surfaces will withstand extreme application conditions better than dry friction material because the cooling oil can be circulated and the heat dissipated externally. If desirable friction characteristics can be obtained, then wet friction surfaces will nearly always yield better results. However, a known characteristic of all liquids is that the internal shear is extremely high as compared to a solid, and for this reason, whenever an appreciable layer of liquid separates the relatively moving friction members, the dynamic coefficient of friction falls to an extremely low figure and the lubricated friction surfaces function poorly in transmitting energy through the liquid from one member to the other. In order to overcome this objectionable feature and still maintain the advantages of a lubricated or oil bath friction surface, it is believed that the concept of boundary lubrication has been taken advantage of in the instant application. Boundary lubrication generally is known to be the stage or transition between dry friction and liquid lubrication. A characteristic of boundary lubrication is that the bulk viscosity of an oil lubricant plays only a small part in the friction behavior of the friction surfaces since the relatively moving friction surfaces are separated by only a very thin film of oil. It is also recognized that under boundary lubrication conditions, the coefficient of dynamic friction between the movable members is dependent not only on the chemical characteristics of the oil or lubricant, but is also dependent upon the nature of the relatively movable friction surfaces.

It is to be understood that the solution to the problem herein set forth relates to control of the dynamic coefficient of friction of the shear surfaces by characterizing or forming the lubricated surfaces in a manner heretofore unknown in this environment. If adjacent lubricated friction surfaces are slowly squeezed together until the bulk oil is removed from between the surfaces, then the static coefficient of friction is the determinant in torque transmitting characteristics. However, when shearing movement between the two members commences, the dynamic coefficient of friction is the design determinant because a transition from static to dynamic coefficient of friction takes place as soon as relative movement between the friction surfaces commences.

It is to be further understood then that if the dynamic coefficient of friction is controlled with respect to the static coefficient, desirable engaging and running characteristics can be obtained and undesirable characteristics can be avoided. Generally, in a start and stop type application such as in a clutch and/or a brake, and especially in an application wherein a great amount of torque is being transmitted from one member to the other and high pressures are evident on the engaging surfaces, the static and dynamic coefficients of friction not only determine the efficiency of energy transmission but also, the type and character of engagements. Ordinarily, if the static and dynamic coefficients of friction are about the same, then chatter is eliminated. However, if the condition is one in which the static coefficient of friction is appreciably higher than the dynamic coefficient of friction, severe chattering results. This observation makes it apparent that control of the dynamic coefficient of friction on lubricated surfaces is very desirable to obtain smooth engagement. Of equal importance is the fact that some materials utilizing conventional engaging surfaces have an initial dynamic coefficient of friction of satisfactory value but prolonged operation results in a substantial decrease in the dynamic coefficient to a value which renders the friction material unuseable for the design application.

An attempted solution to the chattering problem has been to employ various oil additives including extreme pressure lubricants which have a high film strength. In conventional friction disc assemblies, properly selected lubricants have reduced the chattering problem but merely selecting the proper oil to reduce chattering does not result in any increase in the dynamic coefficient of friction but merely effects a smoother and more gradual transition from the static coefficient to the dynamic coefficient.

This invention relates to various structural embodiments or configurations of the engaging friction elements to control and maintain the dynamic coefficient of friction in an oil bath lubricated structure and there are no specific requirements for particular lubricants. Oils which are suitable as ordinary automotive gear lubricants are satisfactory in the practice of this invention. For purposes of illustration and discussion, a disc application will be considered wherein two or more discs are arranged in an axially packed or stacked manner and wherein an engaging force parallel to the axis of rotation of the disc is applied for transmitting force between the respective discs. It is to be understood that the instant novel structural configuration could be utilized in a single disc or cone application. However, for purposes of discussion, the structure hereinafter specifically described is directed to a multiple disc type application.

Briefly, this invention relates to an oil bath type friction application wherein planar surface portions are utilized to transmit torque from one member to another. In one form of the invention, a disc is splined or suitably connected to one of a pair of relatively rotatable members and an adjacent disc is splined or otherwise connected to the other of the members. One of the discs is either plain or characterized while the other of the discs is provided with a characterized or configured surface made up of a plurality of substantially independent projections having a land normal to the axis of the disc. Each of the projections is substantially, physically independent of adjacent projections and depressed or grooved portions provide the interconnecting or spacing means between the projecting portions. The area of each of the lands forms an important part of this invention as well as the ratio of total land area to total depressed or grooved area of the friction disc. These limitations and discussion of the variable involved is hereafter set forth more specifically.

It is an object of this invention to provide an oil lubricated bath friction material wherein the shape of the surface of one of a pair of engaging surfaces is defined in a novel manner to control the dynamic coefficient of friction.

A further object of this invention is to provide an oil bath friction material which eliminates chattering during acceleration and deceleration of relatively movable engageable friction members.

Yet another object of this invention is to provide a characterized friction material which is operative for the purposes disclosed with ordinary automotive gear lubricants.

A still further object of this invention is to provide an oil bath friction surface which has increased life over a dry friction surface.

Still another object of this invention is to provide a surface characterization or configuration which can be applied to practically any friction material and render the particular material superior in torque transmitting characteristics and life in an oil bath application.

These and other objects and advantages will become more apparent from the following detailed description of the device and from the accompanying drawings wherein:

FIGURE 8 is a graphical representation of the dynamic coefficient of friction plotted against various grid patterns.

Figure 1:
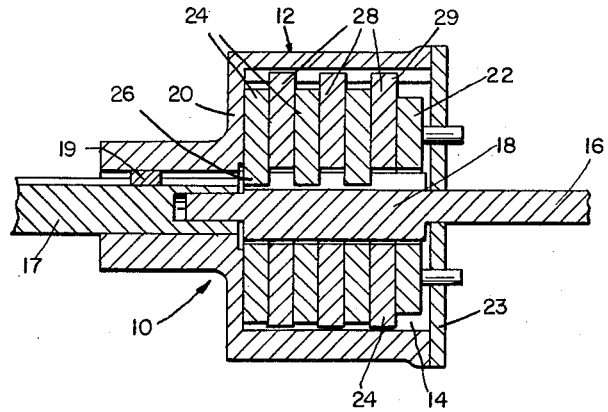
FIGURE 1 illustrates a rotating device utilizing discs formed in the novel manner disclosed herein.
Figure 2:
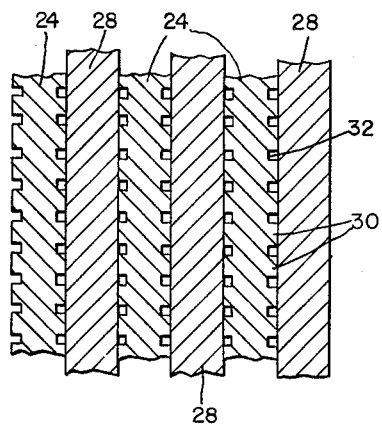
FIGURE 2 is an enlarged detailed cross-sectional view of a portion of the structure shown in FIGURE 1.
Figure 3:
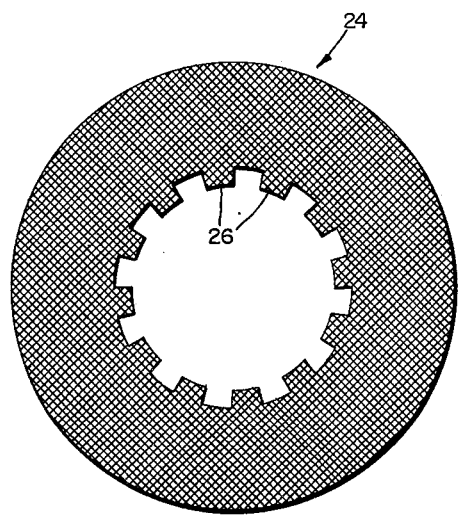
FIGURE 3 is a plan view of one of the discs shown in FIGURE 1.

Referring to the drawing for a more detailed description of this invention, FIGURE 1 is a cross-sectional view of a typical clutch application utilizing this invention. A torque transmitting device 10 is comprised of a housing 12 having a quantity of oil 14 filling or partially filling the housing. A shaft 16 has formed integral therewith a splined hub portion 18. A backing plate portion 20 of housing 12 functions as an axial closing means and a closure plate 23 seals the remote end of the housing. A shaft 17 is fixed for rotation with housing 12 by key 19. A pressure plate 22 is adapted to be axially moved by suitable operating means to axially pack a plurality of friction discs comprising a first set of discs 24 plined at 26 to hub 18 and a second set of discs 28 splined at 29 to housing 12. As illustrated, discs 24 are disposed alternately between discs 28 and when it is desired to engage and disengage the clutch structure, the pressure plate is moved to the left for engagement and to the right for disengagement, respectively. With this arrangement, torque is transmitted from one shaft to the other through the friction discs. A clutch structure is utilized for convenience of discussion and illustration but obviously, the present invention can be utilized in other structures whether they be clutches, brakes, dynamometers, couplings, or retarders, etc.

Referring to FIGURES 2 through 5, discs 28 are flat, steel metallic discs. The thickness of discs 28 is not extremely critical but it is desirable to make these discs as thin as possible so that the total disc assembly will contain a greater number of discs and thus more friction surfaces are made available. For example, when plain steel discs are utilized of a diameter of about 6", it is feasible to make the discs as thin as .045". The surface flatness is not of extreme importance since a thin disc is flexible under engaging pressure but a disc of uniform thickness is required. The kind of material utilized for the plain or uncharacterized discs 28 is a function generally of the desired static coefficient of friction. It has been found that plain steel discs operate satisfactorily for most practical applications and the consideration of another material would not be necessary unless it would be desirable to have a static coefficient of friction decidedly different than that obtainable with plain steel discs. In the practice of this invention, it has been found practical to alternately dispose characterized discs 24 between plain or smooth discs 28. However, it is within the scope of this invention to dispose characterized surfaces in contact with each other, especially in relatively low unit loading applications, and it is also contemplated to provide known oil circulating grooves in an otherwise smooth disc disposed in contact with a characterized disc. Discs 24 are comprised of an annular disposition of material having substantially parallel, axially spaced surface portions adapted to cooperate with mating smooth surfaces on discs 28. In accordance with the present invention, a plurality of substantially independent projecting portions 30 are defined by forming grooves or cut-out portions 32 between projecting portions 30. Each of the projecting portions is provided with a planar surface or land 34 disposed at the unsupported end of projections 30 and in coplanar relationship. It is to be noted that the lands are not necessarily disposed normal to the axis of the rotation of the discs, but could also be arranged so that the discs would be wedge-shaped in cross-section; that is, with the I.D. portion of the disc having a lesser or greater thickness than the O.D. portion. In the practice of the instant invention, this relationship is not critical and the only practical limitation is that the discs at either the O.D. or I.D. must be of sufficient thickness to withstand the shear forces which are imposed by transmitting forces from the disc to the element to which it is splined and also, that the discs must be of a sufficient thickness to withstand normal distortion. Obviously, discs 24 and 28 must be of compatible shape so that when the pack is engaged, the surfaces are in substantial engagement or in boundary layer engagement.

It is appropriate to point out that it is well known in the art to provide cooling grooves in the engaging surface of an oil bath clutch to facilitate distribution and flow of cooling oil so that the heat generated by the friction of engagement is readily carried away by the cooling oil. Grooves have also been provided to facilitate movement of the relatively rotating members toward each other by providing an exit means for the bulk of the oil from between the engaging surfaces. Included in this type grooving are grooves of a spiral configuration, multiple spiral, fast lead spiral, multiple spiral with blind cross grooves, radial grooves, and waffle grooves of either diamonds or squares or other shapes. However, without exception, it is taught and specifically disclosed in the grooving heretofore shown in the art, that the grooves should not define individual projections of less than an area of about .02 square inch and generally, the grooves are disposed in a manner to define projections of considerably greater area, ranging from 0.2 square inch to several square inches in area. Grooves of the aforementioned type which are known in the art do not define a characterized friction surface which yields a higher dynamic coefficient of friction than the same material when it is not characterized. The known grooving arrangements serve the sole function of more efficient dissipation of heat and a means to facilitate removal of the bulk of the oil from between the engaging surfaces.

Referring again to FIGURES 2 through 5, projecting portions 30 are formed integral with a base supporting portion 31 and are preferably arranged in a regular geometric pattern. However, it is to be noted that the individual projecting portions are not necessarily of exactly the same shape but must conform to certain dimensional limitations which will be hereinafter more fully considered.

Projecting portions 30 can be formed in several suitable ways such as milling grooves 32 between projecting portions 30, stamping the pattern of the disc, rolling the pattern of the disc by suitable configurated rollers, etching the discs and/or chemical milling.

In order to more fully understand the scope of this invention, it is appropriate to discuss operating characteristics of this device. When discs 24 and 28 are brought into operating relationship by application of a force parallel to the axis of the discs, the bulk oil film which is present between the discs is reduced to a boundary layer thickness by displacement of the excess oil from between the projecting surface 34 and the surfaces of the mating disc into the groove portions 32. It is extremely important to note that the area of surface 34 of an individual projecting portion 30 is critical within certain ranges and whenever this surface or land is of an area greater than about .002 square inch, the dynamic coefficient of friction is not materially increased.

Although it is extremely difficult to observe or measure the change in degree of surface lubrication for different sized lands, it is believed that variations in land area affect the dynamic coefficient of friction for the following reasons. In a characterized disc having lands within the disclosed surface area range, a certain amount of metal to metal or surface to surface contact takes place in a consistent fashion while at the same time sufficient lubrication is maintained to cool the surfaces and prevent scoring and seizure. When the area of individual lands is materially increased, it is believed that mixed lubrication takes place. Mixed lubrication is defined as the transition range between boundary lubrication in which the solid surfaces are little more than contaminated with oil and hydrodynamic, or fluid, or thick film lubrication, in which the load between the solid surfaces is carried entirely by the oil and no metal to metal contact occurs. It is well known that smooth discs operate under mixed lubrication conditions in steady state operation; that is, part of the load is carried by the oil film and part is carried by the surface to surface contact of the adjacent friction surfaces. It is believed that when the area of individual lands is materially increased outside the disclosed range, there is a substantial decrease in surface to surface contact and more of the load is carried by the oil film which results in a significant decrease in the dynamic coefficient of friction. A characterized surface having lands of an area in the disclosed range yields a type of contacting surface wherein there is sufficient surface-to-surface contact to raise the dynamic coefficient of friction significantly without seizure or scoring. This explanation logically accounts for the characteristic of the instant novel friction surface that the dynamic coefficient of friction is independent of the unit loading and is also independent of the velocity between the adjacent surfaces. In contrast, a characteristic of hydrodynamic lubrication is that the dynamic coeffiicent of friction rises in direct proportion to increasing speed and the dynamic coefficient decreases in proportion to increase in unit loading.

It is of equal importnce that the grid density or number of lands per unit area be controlled. This relationship necessarily holds because it has been found that the land area per unit area of the disc should preferably constitute at least 25% of the total projected unit area in most practical applications. If the land area is substantially less than 25% of the total projected area of the disc, then the unit loading becomes excessively high and physical breakdown of the disc material is accelerated when a porous or inorganic material is used. However, in applications where the engaging force is of such a magnitude that only low unit loading is encountered and the contacting surfaces are both dense, such as steel to steel, then a lower percentage of land area is tolerable. For example, in the configuration shown in FIGURE 5, it has been found by experimentation that rectangular lands measuring .020 inch on a side and grooves or channels of .020 inch width perform in a very satisfactory manner. Lands and grooves of the aforementioned size constitute a disc surface having 25% land area and 75% projected groove area. Satisfactory performance is also obtained by utilization of square lands measuring .020 inch on a side and grooves .010 inch wide. Lands and grooves of this relative size constitute a surface having 44% land area and 56% groove area. It is extremely important to note at this point that the dynamic coefficient of friction of discs utilizing the instant novel configuration is for all practical purposes, independent of the load. Naturally, the torque transmitted by such a device is dependent upon the unit loading as well as the total engaging surface area, but the dynamic coefficient of friction is not a function of the disc engaging load or of unit loading per disc.

It must be understood that certain variations are acceptable within the scope of this invention but limitations as to the size of the individual projected portions and the number of projections per unit area are the controlling design factors. Within certain limits, however, the area of each land should not exceed .002 square inch. However, it is obvious that if in a disc having lands of .0004 square inch, such as .020 inch square lands, and constitut'ng 25% of the total disc area, that would not be a material departure from the scope of this invention to make a few of the lands per square inch of an area appreciably larger than the aforementioned .002 square inch. However, as a general rule, at least about 75% of the projections should be of an area not greater than .002 square inch and in all cases, the number of lands should not be less than about 200 lands per square inch. For example, in a disc having square lands measuring .030 inch on a side and grooves .010 inch wide, there would be 625 lands per square inch. At least 75% of these lands should be of an area not greater than .002 square inch without departing from the scope of this invention. Such a limitation necessarily limits the area of the remaining lands because the number of lands should not be less than about 200 lands per square inch.

It is also important to note that there is no exact requirement for uniformity of groove width or distance between adjacent lands. For example, if the lands are of irregular shapes, the bordering portions of adjacent lands can conceivably be positioned within .005 inch of each other without departing from the scope of the invention. However, optimum results are obtained when enough space is provided between each of the individual lands to allow a free flow of oil between the lands when the bulk oil film is displaced from between the lands and the adjacent cooperating friction surface.

From the foregoing, a generalization can be made that it is desirable to provide as many projections or lands as possible and that at least 200 lands per square inch are necessary to obtain results in the optimum range. It is also within the scope of this invention to provide lands of an area of .0001 square inch or less. The limitation as to minimum land area is determined by the practicality of forming the lands in the disc.

It is appropriate to observe at this point that the instant invention is not of sufficient scope to encompass such random surface treating techniques as abrading the friction surface with an abrasive material (e.g. sand paper) or by shot blasting the surface. Such techniques do not insure substantial isolation of the lands and no close control can be maintained over the depth and/or width of grooves, the density of lands per unit area and/or the size of the individual lands. Abrasive roughening and/or shot blasting introduces too many variables which cannot be controlled, and consequently a predetermined desired dynamic coefficient of friction cannot be obtained. The instant novel invention does provide for control of the aforementioned variables and by controlling the grid density, land area, etc., a desired dynamic coefficient of friction can be accurately built into an appropriately characterized disc.

Figure 4:
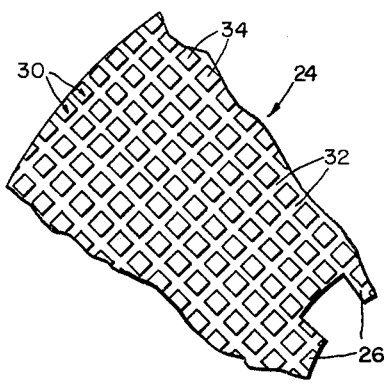
FIGURE 4 is an enlarged view of a portion of the disc shown in FIGURE 3.
Figure 5:
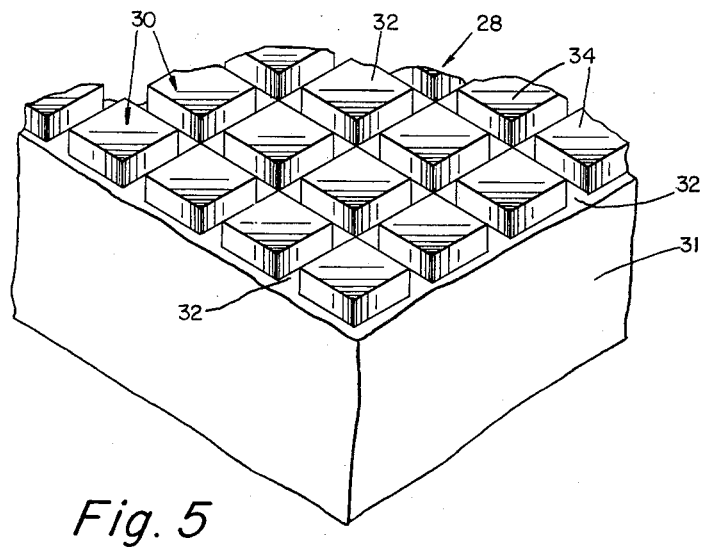
FIGURE 5 is a perspective of a portion of the disc surface shown in FIGURE 4.
Figure 6:
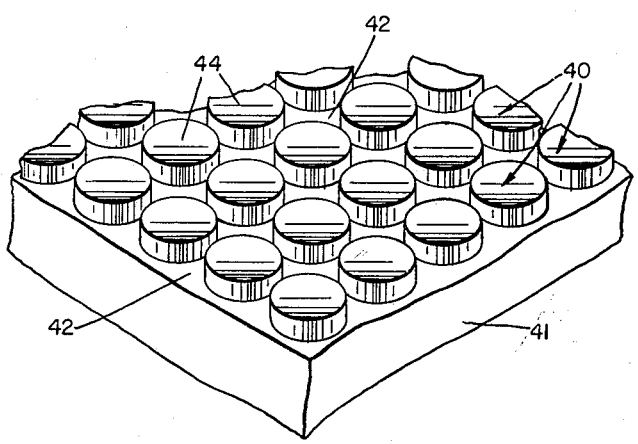
FIGURE 6 is a perspective of a modified disc surface.

Referring to FIGURE 6, a circular land pattern is illustrated. Projected portions 40 are provided with a circular lands 44 of an area approximately .0007 square inch and about 1600 lands per square inch. Grooved area 42 separates the lands. It is to be noted that in this configuration the distance between adjacent portions of each individual land can be generally less than the distance between individual lands in a square pattern, as shown in FIGURES 4 and 5.

Figure 7:
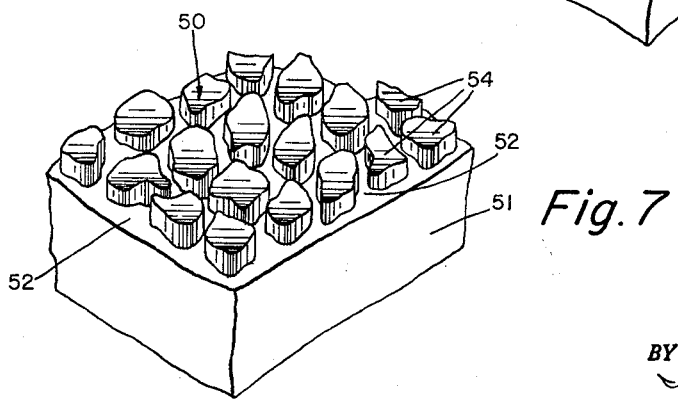
FIGURE 7 illustrates a still further modification of a novel disc surface disclosed herein.

FIGURE 7 illustrates a configurated disc wherein individual projections 50 have lands 54 which are of irregular and random shapes and are separated by grooved portion 52. The lands are not uniformly spaced as in the embodiments disclosed in FIGURES 5 and 6. The area of each individual land does not exceed .002 square inch and as such, defines a disc having at least 200 lands per square inch.

Referring again to FIGURES 5, 6 and 7, the depth of grooves or recesses 32, 42 and 52, respectively, is not extremely critical. It has been found that a depth of at least .003 inch is sufficient to provide grooves or channels of sufficient cross-sectional area to allow for a free lateral movement of fluid during relative rotation of the discs and during the period of time when the bulk film of lubricant is removed from the companion surfaces. It would not be a departure from the scope of this invention to materially increase the depth of grooves. However, if the depth of the groove with respect to the land area becomes exceedingly large, the lateral stability of the individual projections may be affected and it is also conceivable that a beam effect could be experienced if the ratio of projected area to depth of groove is too large. It is also conceivable that with certain low viscosity, high film strength lubricants, a groove depth of less than .003 inch would be sufficient. However, such a reduction in groove depth does not generally operate as satisfactorily as a depth ranging from .003 to .007 inch. As previously mentioned, a minimum groove width of .005 inch is recommended and thus, a minimum width-depth groove cross-sectional area of .000015 square inch is recommended.

In the practice of this invention, it is practicable and advisable in many applications to apply one of the novel patterns disclosed herein to a porous metal disc or to a solid steel disc in mating engagement with a porous metal disc. It has been heretofore recognized that porous metal discs in mating engagement with steel discs in an oil bath application present a combination which has a higher coefficient of dynamic friction than companion discs, both of which are of a non-porous character. A porous metal disc running against a solid steel disc in an oil bath also operates on a boundary lubrication principle thus resulting in a high dynamic coefficient of friction.

When one of the novel patterns disclosed herein is applied to either the sintered metal disc or to the steel companion disc, a higher dynamic coefficient of friction is obtained than when no pattern is applied to either disc. It is also true that within the disclosed grid pattern range, lands of a larger area in the disclosed range are usable with a porous material because the porosity of the material appears to be an increasing factor as the grid density decreases. Conversely, if the friction material is relatively non-porous, the area of individual lands must be smaller than lands formed in a porous material if the same dynamic coefficient of friction is desired. In summary, as the individual lands become smaller and grid density increases within the disclosed ranges, the porosity of the material becomes a diminishing factor.

It is also contemplated within the scope of this invention to apply one of the disclosed patterns in a disc assembly comprising a steel disc running against a non-metallic disc such as a cellulose, thermo-setting, precompacted disc material. As in the case of the aforementioned applications, a higher dynamic coefficient of friction is obtained when one of the disclosed patterns is applied to either the steel disc or the non-metallic disc.

It is to be understood that certain problems which are presented with the various friction materials are not completely eliminated by this invention. For example, it has long been known that porous metal material running against a smooth metal disc in an oil bath application, produces ideal initial results. However, after the initial portion of the operating life has elapsed, the surface of the porous metal disc appears to wipe over, or close, thus removing or destroying the surface porosity of the material. This is due to the instantaneously high temperatures which are attained between contacting irregular surface portions of the steel disc and the porous metal disc resulting in welding of these small contacting portions and eventually, a glazing, or wiping over of the porous surface. When this phenomena takes place in a porous metal application in contact with a smooth steel disc, the dynamic coefficient or friction falls considerably. In the same application and in a structure wherein the same materials are utilized except that one of the disclosed patterns is applied to either the porous material or the steel discs, the inherent porosity of the sintered material is destroyed at about the same cyclic period of operation but the dynamic coefficient of friction is still proportionately higher when one of the novel patterns is utilized.

Referring again to an alternate arrangement of metal and non-metallic discs, the inherent porosity of the non-metallic disc at the operating surface of the disc will remain over a longer period of useful life of the discs because non-metallic discs will generally withstand higher localized surface temperatures without destroying the surface porosity of the non-metallic disc in the vicinity of the elevated temperature.

FIGURE 8 illustrates the new and novel result obtained by application of the instant surface characterization to alternate steel discs in an assembly as shown in FIGURE 1. The assembly was tested in a dynamometer environment by attaching a scale to the driven shaft and measuring torque absorption of the driven member to the scale. The driving discs were rotated at a rate of 200 feet per minute and a unit loading of 150 lbs./square inch was continuously applied for a period of one hour. The lubricating oil was a conventional automotive gear lubricant of the 80–90 grade and a substantially constant oil temperature was maintained by circulating the oil through a cooling radiator. The dynamic coefficient of friction values shown in FIGURE 8 were observed at this time and plotted as illustrated. The figures listed on the abscissa indicate the side dimension of square lands. The .010 inch and .025 inch square lands were separated by .010 inch wide grooves, the .030 inch, .035 inch and .040 inch square lands were separated by .020 inch wide grooves, the .060 inch square lands by .030 inch wide grooves, the .1 inch square lands by .040 inch wide grooves and the .187 inch square lands by .162 inch wide grooves.

It is readily apparent that the dynamic coefficient for lands .045″ square and smaller increases at an entirely different rate than lands larger than .045″ square. It is further apparent that the smaller the land size under .045 inch square, the higher the dynamic coefficient of friction. This graphical representation makes it clear that lands having an area of .002 square inch or less will materially increase the dynamic coefficient of friction.

Of equal importance is the fact that the novel characterization disclosed herein produces a torque transmitting means wherein the dynamic coefficient of friction can be maintained at the desired design value with a minimum decrease or fall-off in the dynamic coefficient.

This characteristic is shown by the table hereinafter set forth, showing a comparison between different materials. In these tests, oil temperature was maintained at about 175° F. and the test units were run for 5000 cycles unless the material scored or seized before 5000 cycles were completed. The discs were run at 1500 feet per minute at a unit pressure of 150 p.s.i. and the engaging pressure was alternately applied and released at the rate of 40 cycles per minute. Lands .020 inch square were formed in one of the mating surfaces and grooves .010 inch wide separated the lands in each of the materials tested. The companion disc was provided with a smooth surface.

| | Disc "A" | Disc "B" | Dynamic Coefficient of Friction | No. of Cycles |
|---|---|---|---|---|
| 1 | Plain steel | Plain steel | .02 | |
| 2 | Patterned steel | do | .052 | 5,000 |
| 3 | Powdered Fe | do | .025 | 400 |
| 4 | Patterned Powdered Fe. | do | .09 | 5,000 |
| 5 | Patterned steel | Powdered Fe | .052 | 5,000 |
| 6 | Powdered Bronze | Plain steel | .054 | 3,000 |
| 7 | Patterned Powdered bronze. | do | .085 | 5,000 |
| 8 | Inorganic | do | .055 | 5,000 |
| 9 | Patterned Inorganic | do | .08 | 5,000 |
| 10 | Patterned steel | Inorganic | .12 | 5,000 |

These figures render it clear that the grid pattern vastly improved the dynamic coefficient of friction.

For example, alternate powdered iron and plain steel had $.025 f_d$ and this valve was doubled to $.052 f_d$ when the grid pattern was applied to the steel discs. The increase in $f_d$ was even greater when the pattern was applied only to the powdered iron discs. It is to be noted that the powdered iron and plain steel discs were run for only 400 cycles. The test was concluded at this point because the discs scored and seized.

When powdered bronze and steel were run in engagement with no grid pattern, the $f_d$ value was .054. This test was concluded at 3000 cycles because the powdered bronze disc smeared over and the dynamic coefficient fell off abruptly. However, when lands were applied to the bronze discs, $f_d$ increased to .085 and there was no evidence of smearing over after 5000 cycles.

The highest $f_d$ was observed when steel discs were patterned as above and placed in contact with inorganic discs. This combination produced a $f_d$ of .12 as compared to a $f_d$ value of .055 when plain inorganic discs were run against plain steel discs.

As previously noted, it is desirable that the land area per projected unit area of the disc be at least 25%. This relationship is especially true when running inorganic discs against steel discs because it is desirable to maintain the unit loading as low as possible by providing a high percentage of land area to total area and also providing high grid density. This relationship also holds true when runing porous compacted materials against a dense material because the porous material does not have the physical strength to withstand high unit loading.

In general, when running a dense material against a dense material, such as steel to steel, a higher unit loading is tolerable and for certain light load applications, a land area of less than 25% of the total area would be operable for the purposes disclosed.

These results make it very clear that the disclosed new and novel characterization of one of a pair of engaging surfaces in a lubricated environment materially increases the dynamic coefficient of friction of the discs over the same relationship of plain discs. This new and novel result is accomplished substantially independent of the engaging force imposed on the discs and also effectively eliminates chattering during engagement of the friction surfaces. This surface characterization also increases the dynamic coefficient of friction to an extent to make lubricated clutches, retarders and brakes feasible in applications heretofore not practical.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

What I claim is:

1. A force transmitting means comprising relatively movable members, at least one of said members having a working surface including lands distributed over a substantial portion of said working surface, the other of said members having a surface thereon disposed substantially parallel to said working surface and in force transmitting relationship with said lands, viscous fluid means flowable between said members, means defining grooves between said lands to provide a flow path for said viscous fluid, said lands having a major dimension substantially less than the distance in any direction from any one edge to an opposite edge of said working surface, and said lands each having a projected surface portion and being of a density of at least 200 lands per square inch.

2. A device defined in claim 1 wherein at least 75% of said lands are each of an area not greater than .002 square inch measured on the projected surface portion of each land.

3. A device defined in claim 1 wherein said surface on the other of said members includes lands being of a density of at least 200 lands per square inch.

4. A force transmitting means comprising relatively movable members, at least one of said members having a working surface including lands distributed over a substantial portion of said working surface, the other of said members having a surface thereon disposed substantially parallel to said working surface and in force transmitting relationship with said lands, viscous fluid means flowable between said members, means defining grooves between said lands to provide a flow path for said viscous fluid, said lands having a major dimension substantially less than the distance in any direction from any one edge to an opposite edge of said working surface, and said lands each having a projected surface portion and being of a density in a range from 400 to 2500 lands per square inch.

5. A device defined in claim 4 wherein at least 75% of said lands are each of an area not greater than .002 square inch measured on the projected surface portion of each land.

6. A rotatable power transmitting assembly comprising a first member, a second member rotatable relative to said first member, one of said members having a force transmitting portion, the other of said members having a force receiving portion disposed substantially parallel to said force transmitting portion, viscous fluid means flowable between said members, said force transmitting portion and said force receiving portion being disposed in force transmitting relationship with respect to each other, one of said portions including lands distributed over a substantial area of said portion, means defining grooves between said lands to provide a flow path for said viscous fluid, said lands having a major dimension substantially less than the distance in any direction from any one edge to an opposite edge of said portion upon which said lands are disposed, and said lands each having a projected surface portion and being of a density of at least 200 lands per square inch.

7. A device defined in claim 6 wherein at least 75% of said lands are each of an area not greater than .002 square inch measured on the projected surface portion of each land.

References Cited in the file of this patent

UNITED STATES PATENTS

| | | |
|---|---|---|
| 1,622,261 | Payne | Mar. 22, 1927 |
| 2,779,175 | Le Hew | Jan. 29, 1957 |
| 2,965,205 | Winchell | Dec. 20, 1960 |